C. L. BURDICK.
CLIPPER OR MACHINE FOR CUTTING HAIR, WOOL, AND THE LIKE.
APPLICATION FILED NOV. 7, 1912.
1,202,026.
Patented Oct. 24, 1916.
2 SHEETS—SHEET 1.
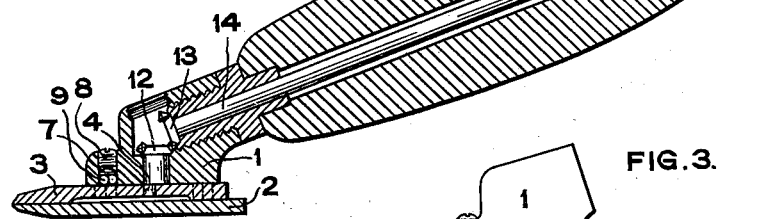
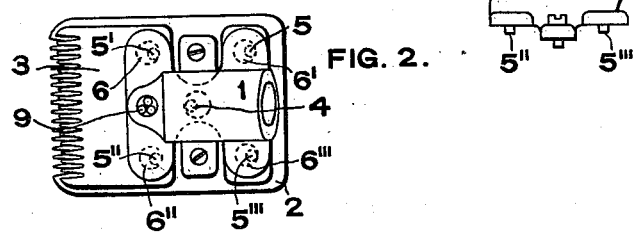
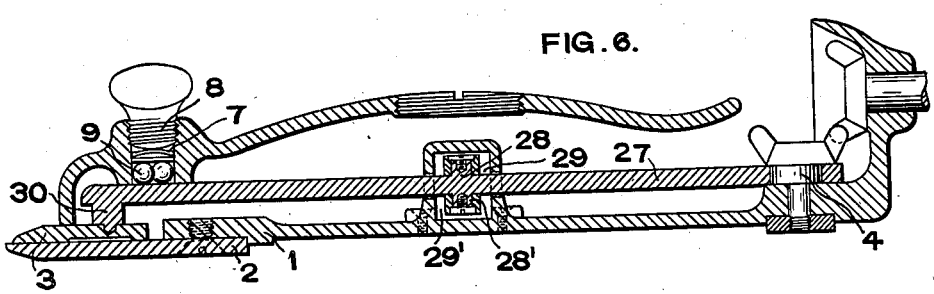
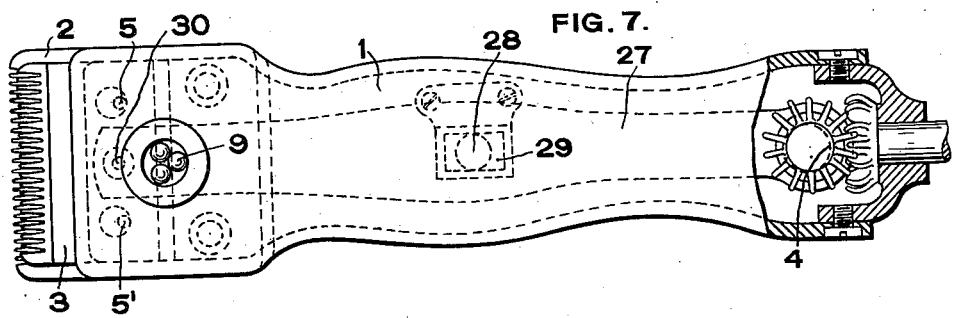
Witnesses
Inventor
Charles Lawrence Burdick C. L. BURDICK.
CLIPPER OR MACHINE FOR CUTTING HAIR, WOOL, AND THE LIKE.
APPLICATION FILED NOV. 7, 1912.
1,202,026.
Patented Oct. 24, 1916.
2 SHEETS—SHEET 2.
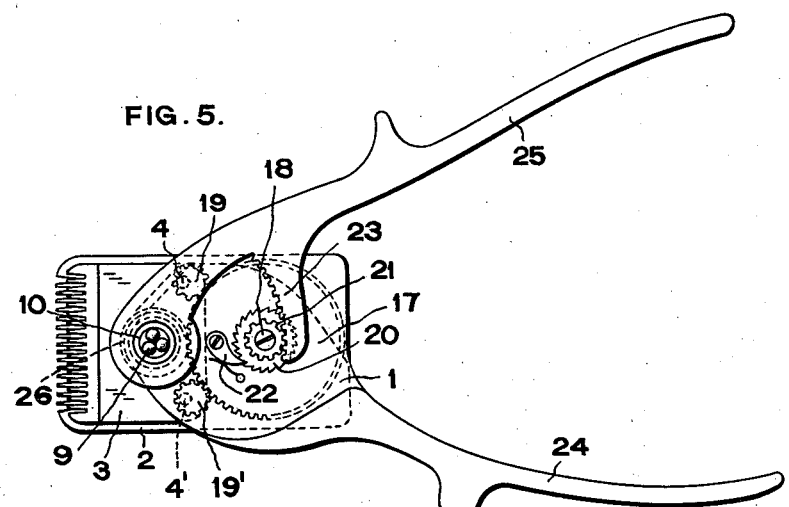
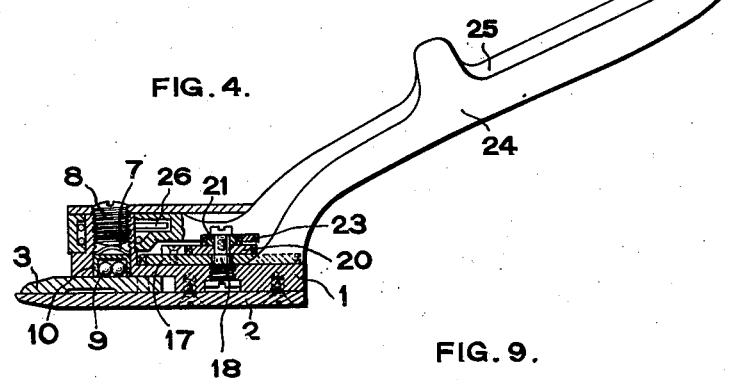
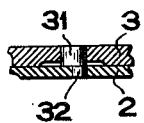
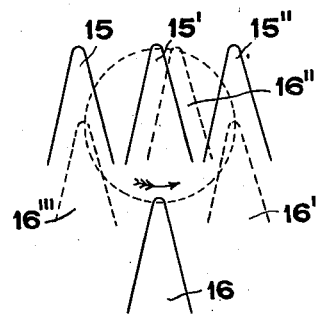
Witnesses
Inventor
Charles Laurence Burdick

UNITED STATES PATENT OFFICE.

CHARLES LAURENCE BURDICK, OF LONDON, ENGLAND.

CLIPPER OR MACHINE FOR CUTTING HAIR, WOOL, AND THE LIKE.

1,202,026. Specification of Letters Patent. Patented Oct. 24, 1916.

Application filed November 7, 1912. Serial No. 730,002.

*To all whom it may concern:*

Be it known that I, CHARLES LAURENCE BURDICK, a citizen of the United States, residing at London, England, have invented new and useful Improvements in Clippers or Machines for Cutting Hair, Wool, and the like, of which the following is a specification.

This invention relates to clippers or machines for cutting hair, wool and the like, and the object of the invention is to provide a simple and efficient machine which can be readily adjusted, and which may be operated either by hand or by power. Furthermore, in other forms of clippers it was heretofore proposed to impart varying movement of the cutter blade and the means employed included an eccentric drive, but the movement of the cutter blade was controlled from a varying fulcrum, consequently, owing to the variable relative positions between the eccentric drive and the fulcrum, an inconstant movement, which may be termed a combined oscillating and rotary movement, was obtained. With a movement of this kind the cutting teeth, according to their distance from the center of the blade, were given greater or less movement and some of the moving teeth, particularly the end ones, would assume angular positions relatively to the fixed teeth, in which positions these teeth would not cut with the required efficiency. Now according to the present invention the moving cutting teeth at all times move constantly in a definite circular path and all the teeth perform exactly the same movement and remain in all positions in perfect alinement with the teeth of the fixed blade, consequently greater efficiency is obtained.

Heretofore clippers of known types comprise a stationary part which forms or carries the fixed blade or comb having cutting teeth, and a movable blade having cutting teeth, the latter being given motion by various known means for the purpose of effecting a cutting action between the teeth of the movable and fixed blades. In the known constructions of clippers the movable blade is arranged to either reciprocate to and fro in a straight path or the blade is caused by curved guides to move in a curved path. In other prior constructions the movable blade is given a partial or complete rotary movement from a fixed center. With clipping machines so constructed and arranged the movable blade together with its teeth reciprocates or travels in a true circle about a fixed center.

My improved clipper differs essentially from known constructions inasmuch that the movable blade or plate forming a part thereof is given a cam like movement whereby each cutting tooth of the movable blade is given a rotary movement about its individual center, and still the teeth remain constantly parallel to their original position.

In carrying out the invention, I provide the usual fixed comb or cutter and give the teeth of the movable blade or plate a rotary movement by advancing the teeth of the movable blade, while nearly above or in alinement with a corresponding tooth of the fixed plate or blade and meeting the edge of the tooth next thereto while approaching or near the extreme limit of its movement. By this means I produce an approximately circular slicing movement of the moving tooth as it meets the cutting edge of the stationary tooth thereby effecting a more perfect cutting action.

By my invention I secure a continuous movement of the parts thus obviating lost motion and excessive vibration of the oscillating parts, thereby insuring a better entrance of the comb into thick hair or wool. Furthermore, the points of the teeth in known forms of clippers have the tendency to strike the hair or wool and push it away from the comb, but in accordance with my invention, the position of the teeth is such during the interval in which the upper teeth are returning for the stroke, that the comb is permitted to freely enter the wool and so facilitate the cutting.

My improved clipper possesses other advantageous features in that the position of the teeth of either cutting blade may be adjusted so as to obtain the best cutting effect for various requirements and for special purposes the number of teeth of either blade may be increased as required.

The rotary movement of each individual tooth is obtained by imparting a rotary parallel movement to the upper blade near its center by means of a shaft having an eccentric, and guides are positioned so as to engage perforations in the plate, thereby limiting the movement of the plate to the movement of the eccentric on the driving shaft The guides may be placed forward or back of the driving center or on either side or both sides thereof and may be provided with anti-friction devices if needed, or if desired the guides may be dispensed with by using two or more eccentrics working in unison. Further, according to my invention, spring controlled mechanism, capable of being readily adjusted is provided to secure tension between the cutting blades.

Clipping machines of the class to which my invention belongs usually require adapting to the character of the work to be done, therefore I have shown modifications of the general principle of my invention suited to hand and power machines and adapted to various classes of work and these details together with the main elements of my invention are illustrated in the accompanying drawings in which—

Figure 1 represents in section one form of the improved clipper or machine, the section being taken vertically along the longitudinal center line of the machine; Fig. 2 is a plan view of the clipper with the handle taken away; Fig. 3 is a detail view showing the body portion of the clipper; Fig. 4 shows in section a modified form of clipper suitable for operation by hand; Fig. 5 is a plan view of the hand clipper; Fig. 6 represents in section another form of the improved machine; Fig. 7 is a plan view of the last mentioned construction; Fig. 8 is a fragmentary detail view showing portions of the fixed and movable blades, and Fig. 9 represents diagrammatically the movement of the cutting teeth.

Like numbers refer to similar parts in the various forms of construction, which parts are capable of being alternatively employed in any of the embodiments of the invention illustrated, according to requirements and to obtain the best results.

Referring generally to the drawings, 1 represents a body portion carrying the handle and the operative parts of the clipper, 2 is the lower cutting blade or comb which is removably secured to the body portion, 3 is the upper cutting blade to which rotary or cam movement is imparted by means of one or more cams or eccentrics, 4 in Figs. 1 and 2, and 4—4′ in Fig. 5. Guide pins 5—5′—5″ and 5‴ secure alinement of the cutting teeth and 6—6′—6″ and 6‴ are holes or recesses in the upper cutting blade which receive the guide pins. Spring 7 and adjusting nut 8 are employed for securing and maintaining the proper tension between the cutting blades and rollers or balls 9 carried in a semi-inclosed casing 10 (see Figs. 4 and 5) serve to reduce friction in the tension device.

In the form of machine shown in Figs. 1, 2 and 3, the guides are attached to and project downward from the body portion and are positioned to enter holes or recesses in the upper blade, the holes being large enough to admit of the full cam movement and limiting the movement in each direction The central shaft carrying the eccentric 4 is driven by a bevel gear 12—13 and shaft 14 is centrally positioned in the handle, but any convenient form of drive may be employed.

The cutting operation of the machine is shown in the diagram Fig. 9 in which 15—15′—15″, represent teeth in the lower or fixed blade and 16 represents a single tooth in the upper or movable blade, the circle representing the movement which may be in either direction by reversing the drive, and for the purpose of demonstration only, the arrow represents the direction of the movement. The tooth 16 will first move to the position of tooth 16′ and then to 16‴ and in turn to 16″, and as thus illustrated, the movement is continuous and approximately circular, and the movable blade being kept in alinement, each tooth thereon will follow the same movement. In the diagram, the teeth of the movable blade will be nearly above the corresponding teeth of the stationary blade at the extreme point of the outward movement, but the movable blade may be positioned so as to lie on either side to secure greater cutting efficiency for different kinds of work. It will be seen that the advancing and receding movement must give a slicing movement to the cut at every point except at the very limited dead center of the outward stroke, while for a certain portion of the stroke, the upper blade is withdrawn to permit free entrance of the material to be cut.

The modification shown in Figs. 4 and 5 is suitable for operation by hand and is driven by multiplying gearing to obtain a higher speed of travel for the movable blade. A large gear wheel 17 is mounted on a stud 18 and meshes with two small gear wheels 19—19′ which are attached to the shafts carrying the eccentric 4—4′. Mounted on the stud 18 above the driving gear wheel is a small ratchet wheel 20 secured to a gear wheel 21. A spring actuated pawl 22 is fixed to the gear wheel 17 and serves to communicate the motion from the wheel 21 to the wheel 17 when moved in one direction and allows of the return of the wheel 21 when the action is reversed. A toothed segment 23 is attached to one of the operating handles of the machine and rotates the small gear when the handles are opened and closed. The handle 24 is secured to the body portion of the machine and the handle 25 is pivoted at the forward end of the machine and its outward movement is effected by a spring 26. In operating this hand machine, the handles will be brought together while advancing the teeth into the hair or wool, and when the full stroke has been taken the spring will separate the handles for the next cutting movement.

It will be understood with the form of machine last described, guides, (not shown) such as previously described, may be employed to perfectly control the movement of the movable cutter.

Figs. 6 and 7 illustrate a form of the improved clipper particularly useful for sheep shearing. In this embodiment, for convenience of construction, the cam driving means are placed in the outer extremity of the handle and movement of the upper blade is effected by means of a lever 27. I arrange a fulcrum by fixing at the center of the shaft one or more studs 28—28' preferably provided with rollers guided by a slot or slots 29—29' located in the handle portion. In this form of construction the tension mechanism may be mounted above and bear upon the lever and friction may be reduced by providing a cone bearing in the stud 30 which fits into suitable opening in the blade 3, and as shown two guides are employed.

Fig. 8 shows another form of guide which may be provided with a shaft 31 fitted in a hole in the upper blade and the eccentric 32 fitting a hole in the lower blade, the eccentricity corresponding with the movement of the driving cam.

What I claim is:—

1. In a clipper or machine of the class described, a handle or body portion having a fixed toothed blade, a movable cutter blade having movement about an approximately central pivotal connection provided between said movable cutter blade and a coöperating driving member, the pivot of said driving member having a projection which revolves, said driving member having an axis of revolution and guides consisting of projections on the body portion and stationary relatively thereto engaged in curved surfaces in the movable cutter blade, substantially as and for the purpose set forth.

2. In a clipper or machine of the class described, a handle or body portion having a fixed toothed blade, a movable cutter, mechanism comprising a shaft with an eccentric arranged to transmit movement to the movable cutter and guides stationary relatively to the body portion on which they are carried engaged in curved surfaces in the movable cutter whereby the latter is caused to travel in a curved cycle but always parallel to itself.

3. In a clipper or machine of the class described, a handle or body portion having a fixed toothed blade, a movable cutter blade, mechanism for effecting the movement of said movable cutter blade and means for guiding the movement thereof consisting of a pair of studs or posts fixed to the body portion and which studs or posts are each engaged in a hole or opening provided in the movable cutter.

In testimony whereof I have signed my name to this specification in the presence of two subscribing witnesses.

CHARLES LAURENCE BURDICK.

Witnesses:
LEONARD S. POCOCK,
ARNOLD J. TANNER.